United States Patent [19]
Cain et al.

[11] Patent Number: 6,030,646
[45] Date of Patent: *Feb. 29, 2000

[54] CHEWING GUM COMPRISING A TRIGLYCERIDE COMPOSITION

[75] Inventors: Frederick William Cain, Voorburg, Netherlands; Martin John Izzard, Rushden, United Kingdom; Arie Loots, Enkhuizen, Netherlands; James Cameron Mitchell, Wymington Near Rushden, United Kingdom

[73] Assignee: Loders-Croklaan B.V., Wormerveer, Netherlands

[ * ] Notice: This patent issued on a continued prosecution application filed under 37 CFR 1.53(d), and is subject to the twenty year patent term provisions of 35 U.S.C. 154(a)(2).

[21] Appl. No.: 08/556,995
[22] PCT Filed: Jun. 1, 1994
[86] PCT No.: PCT/EP94/01794
  § 371 Date: Apr. 22, 1996
  § 102(e) Date: Apr. 22, 1996
[87] PCT Pub. No.: WO94/28737
  PCT Pub. Date: Dec. 22, 1994

[30] Foreign Application Priority Data

Jun. 10, 1993 [EP] European Pat. Off. .............. 93304517

[51] Int. Cl.$^7$ ....................................................... A23G 3/30
[52] U.S. Cl. ....................................... 426/3; 426/4; 426/6
[58] Field of Search ........................................ 426/3, 4, 6

[56] References Cited

U.S. PATENT DOCUMENTS 4,378,374 3/1983 Reggio et al. .
5,417,988 5/1995 Burger et al. ................................ 426/3

FOREIGN PATENT DOCUMENTS 079 082  5/1983  European Pat. Off. .

OTHER PUBLICATIONS

Patent Abstracts of Japan, vol. 7, No. 263 (C–196), Nov. 24, 1983, & JP,A,58 146 241.

*Primary Examiner*—Helen Pratt
*Attorney, Agent, or Firm*—Pillsbury Madison & Sutro LLP

[57] ABSTRACT

The invention concerns chewing gums that contains a chewing gum base, wherein a remainder, which is 0–65 wt. % paraffin or microcrystalline wax and 35–100 wt. % of a triglyceride composition, is present. The chewing gum may not display a major peak in its DSC thermogram above 55° C.

8 Claims, 1 Drawing Sheet

CHEWING GUM COMPRISING A TRIGLYCERIDE COMPOSITION

This application claims benefit of international application PCT/EP94/01794, filed Jun. 1, 1994, now WO94/28737.

In our co-pending European patent application 93 200801.4 we have set out the problems related with the presence of paraffins or microcrystalline waxes in the gum base for a chewing gum. In this co-pending application we disclosed a method to arrive to more environmental friendly and healthier chewing gums by reducing the amount of the paraffin and/or microcrystalline wax by replacing at least part of this by a triglyceride composition. Although in this way very acceptable products could be obtained, it was found that in some instances the flexibility both initially and upon storage of strips of chewing gum made from these compositions became unsatisfactory. Therefor we have performed a study in order to find out how the problems about the flexibility upon storage could be overcome. As a result of this study we found that it is critical for the desired flexibility that the chewing gum displays a peak in its differential scanning calorimeter-thermogram (DSC) below a specific temperature value. The occurrence of the desired peak in the D.S.C.-thermogram appeared to result from a fine-tuning of the composition and physical properties of the triglyceride-composition applied and the reaction-parameters, in particular the temperature of the mixing in of the triglyceride composition in the chewing gum base. Above therefor means, that we found that in addition to the triglyceride compositions mentioned in EP 93200801.4 also other triglycerides can be applied in our chewing gums. The only prerequisite being that the correct peak in the D.S.C.-thermogram is obtained.

From JP 58/146,241 chewing gums are known, that contain a fat-mixture, as carrier for vitamin E. This fat-mixture is based on medium chain triglycerides (So $C_8$–$C_{10}$ fatty acid residues), while also liquid oil, such as soybean oil, sesame oil, olive oil etc. is present. The above fat/vitamin E mixture is added to the chewing gum in amount of 1–30 wt %. Nothing is, however, disclosed about replacing mineral wax by fat, about the wax-content of the chewing gum, about the occurrence of a peak in the DSC and about the process applied during the preparation. As the above fats are very soft, because of its high liquid oil-content, the fats are unsuitable for fulfilling our aims.

Therefore, our invention concerns with chewing gum comprising (on total product):

(1) 5–30 wt % chewing gum base
(2) 60–94.9 wt % mono-/di-/polysaccharide or a polyalcohol
(3) 0.1–3 wt % softener
(4) 0–2 wt % flavour,
wherein the chewing gum base comprises (on base):
   (a) 20–90 wt %, preferably 20–80 wt % of one or more conventional natural and/or synthetic elastomeric and/or resinous components, and
   (b) 80–10 wt % preferably 80–20 wt % of a remainder, wherein the remainder comprises (on remainder):
      (b-1) 0–65 wt % paraffin and/or microcrystalline wax, and
      (b-2) 35–100 wt % of a triglyceride-composition, while the chewing gum displays, as a result of the triglyceride-composition selected and the reaction-parameters applied during its production, a major peak in its Differential Scanning Calorimeter-thermogram (DSC), when measured with a Perkin Elmer DSC-7® scanning calorimeter, heating at 3° C./min from 20° C. onwards, using samples weight of 5–7 mg, at maximum 55° C.

BRIEF DESCRIPTION OF THE DRAWINGS

Differential Scanning Calorimetry is a known method. As the position of the peak(s) in the D.S.C. thermogram is dependent on the type of apparatus applied and the conditions used during the D.S.C.-measurement, these conditions are critical in defining the position of our major peak(s). In FIG. 1 an example is given of a D.S.C. thermogram of a product with unacceptable flexibility. The major peak in situated at 57.1° C., which is above our criterium of "maximum 55° C.". In FIG. 2 we illustrate the D.S.C. thermogram of a chewing gum with exactly the same (chemical) composition as applied for FIG. 1; however during its production another set of reaction parameters was applied. It can be concluded from FIG. 2 that no major-peaks are present above 55° C. The flexibility of strips of chewing gum made from this last composition remained excellent upon storage (at least 10 months).

Figure 1:
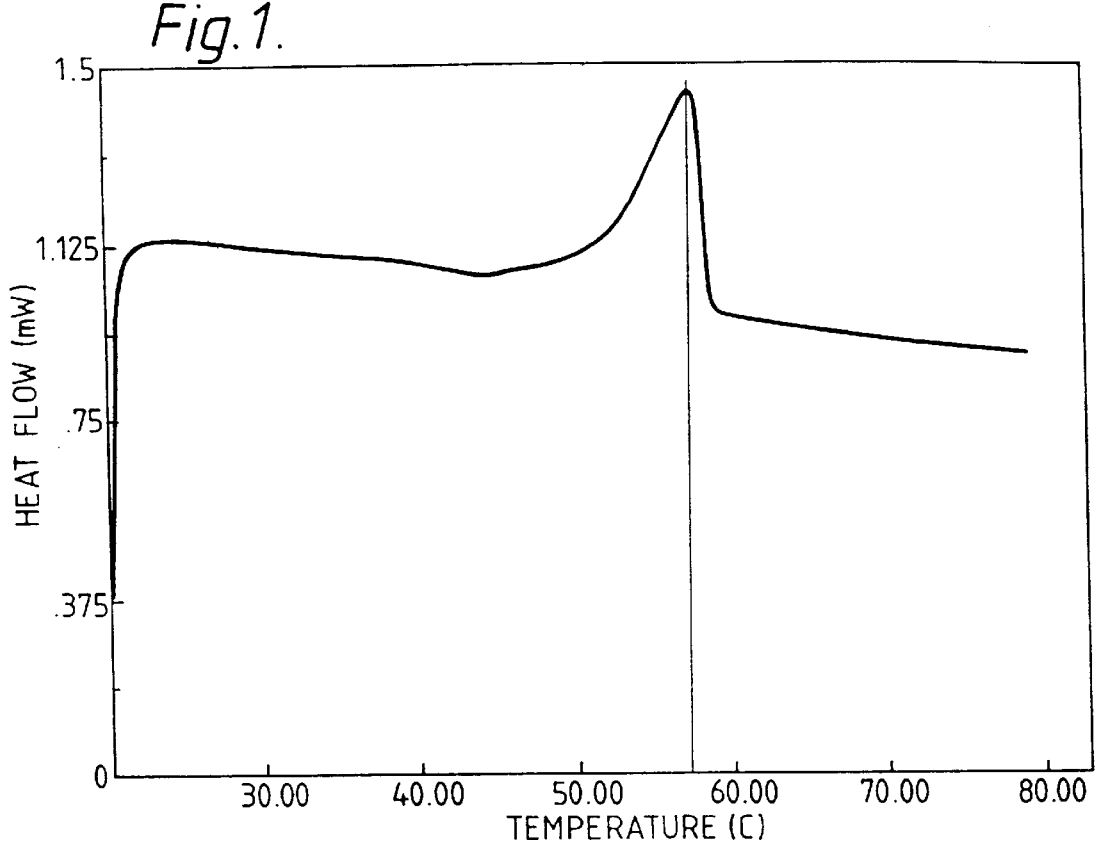
FIG. 1 shows a differential scanning calorimetry (D.S.C.) thermogram of a product with unacceptable flexibility.
Figure 2:
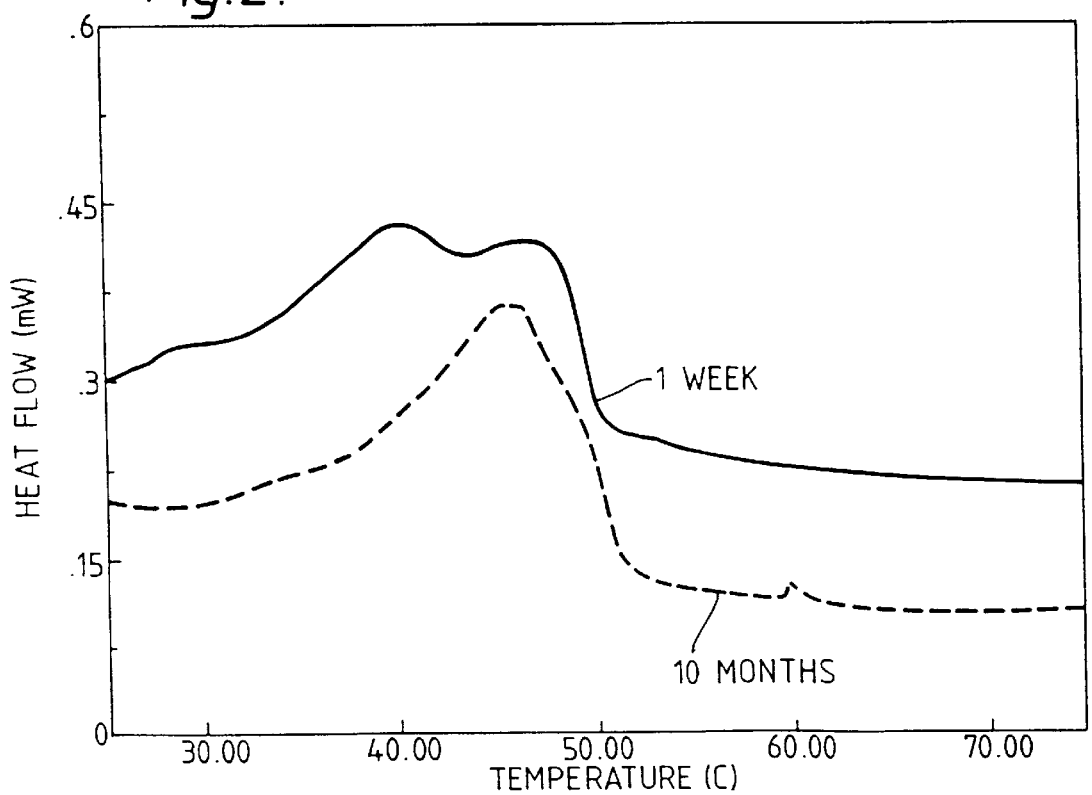
FIG. 2 shows a D.S.C. thermogram of a chewing gum with exactly the same (chemical) composition as the product in FIG. 1 but produced under another set of reaction parameters.

In a preferred embodiment of our invention the remainder (b) comprises: 0–35 wt %, preferably 0–5 wt %, most preferably 0–0.5 wt % of (b-1) and 65–100 wt %, preferably 95–100 wt %, most preferably 99.5–100 wt % of (b-2).

Although no major-peaks may be present above 55° C., we found that some minor peaks can be allowed above this temperature. The terms major and minor being used here define the relative heights of the different peaks in the D.S.C.-thermogram. The best products are obtained, when the major peaks are situated below 50° C., in particular below 47° C. in the D.S.C-thermogram.

Although in principle any fat can be applied, that results in the required peak in the D.S.C. thermogram we prefer to apply triglycerides that display a solid fat index at 35° C. (not stabilized) measured by NMR-pulse ($=N_{35}$) of at least 40, preferably 60–90. In particular triglycerides that have a content of ($C_{16}+C_{18}$) saturated fatty acids of 40–100 wt % and/or a $C_{18:1}$—content of 0–60 wt %, and/or a content ($C_{12}+C_{14}+C_{16}$) saturated fatty acids of at least 30 wt %, and/or a content of ($C_{12}+C_{24}$) saturated fatty acids of 0–40 wt % are preferred.

The mono-/di-/polysaccharide—component (2) can consist of any monosaccharide such as glucose, or fructose, disaccharide, such as sucrose or polysaccharide, such as polydextrose. We prefer, however, a mixture of mono- and disaccharides, that comprises:

10–60 wt % mono-saccharide, preferably glucose-syrup (85%) and/or dextrose, and

30–90 wt % of a disaccharide, preferably sugar.

If a sugarfree product is preferred the saccharides can be partly or completely replaced by a polyalcohol. Suitable polyalcohols being sorbitol (both crystalline and as aqueous solution) and mannitol. In this case a small amount of a high intensity sweetener may be present to impart a sweet taste.

Softeners that are suitable are di- or higher hydroxy alcohol compounds, in particular glycerol. Emulsifiers however can also be used as softener. A preferred emulsifier is lecithin. Monoglycerides, however, are also very suitable.

We also found, that the final water content of the chewing gum has some impact on the product-properties. Therefore, we prefer chewing gums that have a water content of 1–10 wt %, in particular 2–5 wt %.

In chewing gum bases conventionally the following ingredients can be present: elastomers, resins, fillers, anti-oxidants and softeners. As elastomer natural and synthetic elastomers and/or natural and synthetic resins can be used. A listing of useful elastomeric or resinous ingredients can be found in our co-pending European patent application 93 200801.4. In fact this listening comprises three main-types, i.e:

1) Natural gums of vegetable origin, from which a group of about 15 types are mentioned in the above EP.
2) Synthetic gums, from which a couple of examples are given in the above EP, and
3) Synthetic and natural resins and their derivatives. Examples of these materials are also given in EP 93 200801.4.

Fillers that can be used in chewing gum bases are the conventional fillers e.g.: aluminiumhydroxyde, lime-stone, talc, magnesium carbonate or aluminium silicate.

As has been set out above the reaction conditions applied during the production of the chewing gums have a critical impact on the product properties. In particular the temperature that is applied during the blending of the chewing gum base with at least the triglyceride-compound is critical. This temperature should be maintained between 40 and 58° C. Therefor the invention also concerns a process for the preparation of a chewing gum wherein:

a standard gum base, however with a reduced content of paraffin wax and/or microcrystalline wax is melted at a temperature above 80° C., preferably in a microwave oven;

the melted gum base is subjected to shear at a temperature between 40 and 58° C., preferably 45–55° C.;

mono-/di-/polysaccharides, or polyalcohols, softener and triglycerides are added at this temperature, while shearing the mixture, whereupon, in case applied, the flavour(s) is (are) added, while shearing;

the mixture is removed from the mixer and extruded;

the chewing gum composition, so obtained, is conditioned for at least 12 hrs at T=10–30° C. and 30–85% humidity.

EXAMPLES

Example I

Chewing gum was prepared, using the following recipes:

|  | A | B |
|---|---|---|
| triglycerides | 7.3 wt % | 4.8 |
| standard gum base, minus the waxes | 17.7 wt % | 17.7 |
| sugar | 46.0 wt % | 53.2 |
| dextrose | 8.0 wt % | — |
| glucose syrup (85%) | 18.0 wt % | 22.0 |
| glycerine | 1.0 wt % | 1.2 |
| Flavour | 1.0 wt % | 1.1 |

A triglyceride with the following fatty acid distribution was used:

| TG | |
|---|---|
| $C_{12}$ | — |
| $C_{14}$ | — |
| $C_{16}$ | 40.3 |
| $C_{18}$ | 58.0 |
| unsat. f.a. | 2.3 |

It had the following carbon number distribution:
$C_{46}$: 0.3%; $C_{48}$: 3.2%; $C_{50}$=39.6%; $C_{52}$=42.4%; $C_{54}$=13.6%; $C_{56}$=0.8%; $C_{58}$=0.3%; $C_{60}$=0.1%

The chewing gums were prepared according to the following procedure:

1. the standard gum base minus the waxes is melted at 80–90° C. in a microwave oven.
2. the melted gum base is fed into a horizontal Z-blade, mixer (indirectly heated).
3. the glucose and ⅓ of the powdered sugar are added and mixed for 5 min.
4. another ⅓ of the powdered sugar is added; mixing for 5 min.
5. the triglycerides and glycerin are added at the temperature indicated; again mixing for 5 min.
6. the last ⅓ of the sugar is added and again mixing for 5 min.
7. the flavour is added in two parts, followed by thorough mixing.
8. the chewing gum is removed from the mixer.
9. the gum is extruded in a thick sheet and packed in plastic.
10. the gum is conditioned for 24 hrs in air at 20° C. and 50% humidity.

From the chewing gums obtained DSC's were made and the flexibility was evaluated. The results are mentioned in the table below.

| recipe applied | mix-T | major peak DSC thermogram | flexib. |
|---|---|---|---|
| B | 45° C. | 47.8 | 5 |
| A | 50° C. | 46.2 | 5 |
| B | 70° C. | 57.3 | 1 |
| Paraffin | 70° C. | 54.3 | 5 |

Flexibility-evaluation: 1 is not flexible (snappy)
5 is flexible.

Example II

A chewing gum was prepared, using the following recipe:

| Standard gum base minus the waxes | 10.1% |
|---|---|
| Triglycerides | 3.5% |
| Sugar | 52.4% |
| Dextrose | 10.0% |
| Glucose syrup (DE 42) | 22.0% |
| Glycerine | 1.0% |
| Flavour | 1.0% |

A triglyceride with the following fatty acid distribution was used:

| | |
|---|---|
| C-12 | 0.3% |
| C-14 | 0.8% |
| C-16 | 37.0% |
| C-18 | 61.5% |
| C-18:1 | 0.0% |
| C-18:2 | 0.0% |
| C-20 | 0.3% |
| C-22 | 0.3% |

Example III

A chewing gum was prepared, using the following recipe:

| | |
|---|---|
| Standard gum base minus the waxes | 20.5% |
| Triglycerides | 3.5% |
| Sugar | 63.0% |
| Glucose syrup (DE 42) | 11.7% |
| glycerine | 0.5% |
| Flavour | 0.8% |

A triglyceride with the following fatty acid distribution was used:

| | |
|---|---|
| C-12 | 0.0% |
| C-14 | 1.3% |
| C-16 | 76.9% |
| C-18 | 5.6% |
| C-18:1 | 14.1% |
| C-18:2 | 1.2% |
| C-20 | 0.4% |
| C-22 | 0.2% |

The chewing gums of examples II and III were prepared according to the following procedure:

1. the standard gumbase minus the waxes is melted at ±75° C.
2. the melted gumbase is fed into a horizontal Z-blade mixer (indirectly heated); mixed for 5 minutes.
3. The glucose syrup and ⅓ of the powdered sugar is added; mixing for 5 minutes.
4. ⅓ of the powdered sugar is added; mixing for 5 minutes.
5. The glycerine and the triglycerides are added at the temperature indicated; mixing for 5 minutes.
6. ⅓ of the powdered sugar and the flavour are added; mixing for 15 minutes.
7. The chewing gum is removed from the mixer.
8. The chewing gum is rolled out and cut in pieces.

From the chewing gums obtained DSC's were made and the flexibility was evaluated. The results are mentioned in the table below.

| Chew. gum number | Mix-T | Major peak DSC | Flexib. after 6 weeks |
|---|---|---|---|
| ex II | 48° C. | 54 | 5 |
| ex III | 52° C. | 54 | 4.5 | flexibility-evaluation (as carried out by an expert panel):
1 is not flexible
5 is flexible.

We claim:

1. Chewing gum comprising (on total product):
   (1) 5–30 wt % chewing gum base,
   (2) 60–94.9 wt % of a compound selected from the group consisting of mono- and di-polysaccharide and polyalcohol,
   (3) 0.1–3 wt % softener, and
   (4) 0–2 wt % flavour,
   said chewing gum base comprising (on base):
   (a) 20–90 wt % of at least one member of the group consisting of elastomeric and resinous components, and
   (b) 80–10 wt % of a remainder, said remainder comprising (on remainder):
   (b-1) 0–5 wt % of a member of the group consisting of paraffin and microcrystalline wax, and
   (b-2) 95–100 wt % of a triglyceride composition having a solid fat index at 35° C. (not stabilized) measured by NMR-pulse ($=N_{35}$) of at least 40, said chewing gum displaying no major peak above 55° C. in its Differential Scanning Calorimeter thermogram (DSC), when measured with a Perkin Elmer DSC-7® scanning calorimeter, heating at 3° C./min from 20° C. onwards, using sample weights of 5–7 mg, the major peak displayed by said gum in said DSC thermogram being situated below 47° C. and said gum being further characterized by its flexibility even after long storage.

2. Chewing gum according to claim 1 wherein the triglyceride (b-2) displays a solid fat index at 35° C. (not stabilized) measured by NMR-pulse ($=N_{35}$) of 60–90.

3. Chewing gum according to claim 1 wherein the triglyceride (b-2) has a content of ($C_{16}+C_{18}$) saturated fatty acids of 40–100 wt %.

4. Chewing gum according to claim 3 wherein the triglyceride (b-2) has a content of ($C_{12}+C_{14}+C_{16}$) saturated fatty acids of at least 10 wt %.

5. Chewing gum according to claim 4 wherein the triglyceride (b-2) has a content of ($C_{12}+C_{14}$) saturated fatty acids of 0–40 wt %.

6. Chewing gum according to claim 1 wherein the triglyceride (b-2) has a $C_{18:1}$ content of 0–60 wt %.

7. Chewing gum according to claim 1 wherein component (2) comprises:
   10–60 wt % mono-saccharide and/or dextrose, and
   30–90 wt % of a disaccharide.

8. Chewing gum according to claim 1 wherein the softener is glycerol, lecithine or monoglyceride and the gum, has a water content of 2–5 wt %.

* * * * *